United States Patent [19]

Takahashi

[11] Patent Number: 4,688,396
[45] Date of Patent: Aug. 25, 1987

[54] AIR-CONDITIONING HOT-WATER SUPPLY DEVICE

[76] Inventor: Yutaka Takahashi, 115, 5-chome, Chuo 2 Jhyo, Shiraishi-ku, Sapporo-shi, Hokkaido, Japan

[21] Appl. No.: 803,657

[22] Filed: Nov. 29, 1985

[30] Foreign Application Priority Data

Dec. 5, 1984 [JP] Japan ................. 59-184838

[51] Int. Cl.$^4$ .......................................... F25B 27/00
[52] U.S. Cl. ................... 62/238.6; 62/238.7; 62/324.1
[58] Field of Search .............. 62/238.6, 238.7, 324.1

[56] References Cited

U.S. PATENT DOCUMENTS

| | | | |
|---|---|---|---|
| 4,249,390 | 2/1981 | Jones | 62/238.7 |
| 4,266,405 | 5/1981 | Trask | 62/324.1 X |
| 4,327,561 | 5/1982 | McNeal et al. | 62/238.6 X |
| 4,373,346 | 2/1983 | Hebert et al. | 62/238.6 X |
| 4,399,664 | 8/1983 | Derosier | 62/238.7 |
| 4,449,377 | 5/1984 | Draper | 62/324.1 |
| 4,493,193 | 1/1985 | Fisher | 62/238.7 X |
| 4,514,990 | 5/1985 | Sulkowski | 62/324.1 X |

Primary Examiner—Lloyd L. King
Attorney, Agent, or Firm—Wenderoth, Lind & Ponack

[57] ABSTRACT

An air conditioning system including a hot water supply device for producing hot water, said system comprising:

a heat pump refrigerant circuit having a compressor, a hot water heat exchanger connected to the compressor for exchanging heat of the compressed refrigerant with water to be heated, a refrigerant switching device connected to the hot water heat exchanger, a space conditioning heat exchanger connected to the switching device and which operates as a condenser during a heating cycle and as an evaporator during a cooling cycle, a heat transfer heat exchanger connected to the switching device and which operates as a condenser during the cooling cycle and as an evaporator during the heating cycle, and a throttle connected between the space conditioning heat exchanger and the heat transfer heat exchanger means. A water preheater heat exchanger is connected for receiving refrigerant from the one of the space conditioning heat exchanger and heat transfer heat exchanger which is acting as a condenser and supplying it to the throttle, whereby the water preheater heat exchanger preheats water before supplying it to the hot water heat exchanger to thereby increase the heat supplied to the hot water produced by the system.

3 Claims, 4 Drawing Figures

AIR-CONDITIONING HOT-WATER SUPPLY DEVICE

BACKGROUND OF THE INVENTION

1. Field of the Invention

The present invention is related to an air-conditioning hot-water supply device in which a hot-water supply function is provided by a heat pump type air conditioner.

2. Description of the Prior Art

An air-conditioning system hot-water supply device has heretofore been provided in a heat pump type air-conditioning device by installing the heat exchanger for the hot-water supply device on the discharge side of the compressor in the air-conditioning system which is a refrigerant circuit which consists of the compressor, a refrigerant switching device, a space conditioning heat exchanger which becomes a condenser at the time of heating and an evaporator at the time of cooling, a heat transfer heat exchanger which becomes a condenser at the time of cooling and an evaporator at the time of heating, and a throttle device.

In the air-conditioning system hot-water supply device which is composed as described above, during air-conditioning operation, the refrigerant gas, which is compressed by the compressor, becomes high in temperature and is discharged, passes through the heat exchanger for hot-water supply and the water is heated thereby.

According to the above-described conventional air-conditioning system hot-water supply device, the refrigerant, condensed by passing the space conditioning exchanger or the heat transfer heat exchanger which becomes a condenser, is next decompressed by the throttle device. However, the refrigerant, which is condensed with the above-described condenser, still has a usable amount of heat but the heat is not used for any purpose.

SUMMARY OF THE INVENTION

To make use of the heat of the refrigerant condensed with a condenser as described above which is not used for any purpose, the present inventiion provides an air-conditioning system hot-water supply device which increases the hot-water supply capacity by using the heat of the refrigerant effectively and further increases the cooling capacity during cooling operation.

This present invention provides, in order to accomplish the above-described purposes, an air-conditioning system hot-water supply device which is composed of the heat pump refrigerant circuit consisting of the compressor, heat exchanger for hot-water supply, refrigerant switching device, space conditioning heat exchanger means which becomes a condenser at the time of heating and an evaporator at the time of cooling, heat transfer heat exchanger means which becomes a condenser at the time of cooling and an evaporator at the time of heating, and throttle device; and a heat exchanger for preheating hot-water connected between the above-described condenser and the throttle device for heating makeup water which is then supplied to the heat exchanger for hot-water supply.

According to the present invention, during both cooling and heating operation, before the refrigerant, which still has sufficient temperature even when it is condensed in the space conditioning heat exchanger means or heat transfer heat exchanger means acting as a condenser, is decompressed in the throttle device, it is used to heat the makeup water in the heat exchanger for preheating the hot-water supply and the makeup water heated there is then heated in the heat exchanger for hot-water supply, and therefore, the hot-water supply capacity is increases and in addition, at the time of cooling operation the cooling capacity is increased only for the increases part of the above-described hot-water supply capacity.

DESCRIPTION OF THE PREFERRED EMBODIMENT

Figure 1:
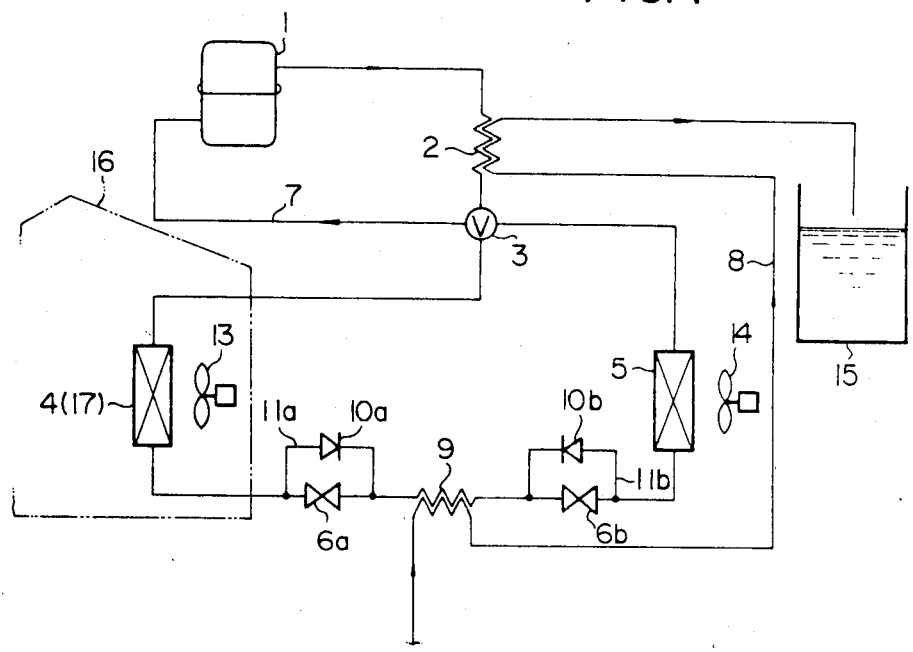
FIG. 1 is a diagram of a refrigerant circuit of an air-conditioning system hot-water supply device showing one embodiment of the present invention.

The present invention is described in detail with reference to the drawings.

Reference numeral 1 designates a compressor. Reference numeral 2 designates a heat exchanger for hot-water supply installed on the discharge side of the compressor 1. Reference numeral 3 designates a refrigerant switching device. Reference numeral 4 designates a space conditioning heat exchanger means which becomes a condenser at the time of heating and an evaporator at the time of cooling. Reference numeral 5 designates a heat transfer heat exchanger means which becomes a condenser at the time of cooling and an evaporator at the time of heating. And, reference numeral 6 designates a throttle device, for example, an expansion valve. These are connected with the refrigerant piping 7 in series and the heat pump refrigerant circuit is formed.

In such a circuit, the basic cooling operation is as follows:

First, at the time of cooling operation, the refrigerant gas, which is compressed with the compressor 1, becomes high in temperature and is discharged, passes the heat exchanger for hot-water supply 2, is sent to the heat transfer heat exchanger means 5 by the refrigerant switching device 3, the heat transfer heat exchanger means 5 acting as a condenser and condenses the refrigerant which passes therethrough, and the refrigerant condensed therein passes the throttle device 6, the refrigerant decompressed therein is fed to the space conditioning heat exchanger means 4, the space conditioning heat exchanger means 4 then acting as an evaporator, the refrigerant vaporizes and absorbs heat from the space, and further, is absorbed through the refrigerant switching device 3 into the compressor 1, and the flow is repeated.

Next, at the time of heating operation, the refrigerant gas, which is compressed by the compressor 1, becomes high in temperature and is discharged, passes the heat exchanger for hot-water supply 2, is sent to the space conditioning heat exchanger means 4 by the refrigerant switching device 3, heat exchanger means 4 acting as a condenser condenses the refrigerant which passes therethrough, and the refrigerant condensed therein passes the throttle device 6, the refrigerant is decompressed and is fed to the heat transfer heat exchanger means 5, the heat source side heat exchanger means 5 acts as an evaporator, and the refrigerant vaporizes and is absorbed through the refrigerant switching device 3 into the compressor 1 and the flow is repeated.

By the basic action of the system in either the cooling operation or heating operation, the refrigerant gas, which is compressed, becomes high in temperature and is discharged, and first passes through the heat exchanger for hot-water supply 2 and here the water sent from the water supply piping 8 is heated.

In the present invention a heat exchanger for preheating the hot-water supply 9 is connected between whichever of the heat exchanger means 4 and 5 is acting as a condenser and the throttle device 6, the makeup water is heated by the preheating heat exchanger 9 for preheating the hot-water supply and the heated makeup water is fed through the water supply piping 8 to the above-described heat exchanger for hot-water supply 2.

As described above, the space conditioning heat exchanger means 4 becomes a condenser at the time of a heating operation and the heat transfer heat exchanger means 5 becomes a condenser at the time of a cooling operation. The refrigerant flows from the space conditioning heat exchanger means 4 to the throttle device 6 at the time of a heating operation, and it flows from the transfer heat exchanger means 5 to the throttle device 6 at the time of a cooling operation. Consequently, the heat exchanger 9 for preheating the hot-water supply connected between the condenser and the throttle device 6 is connected between the space conditioning heat exchanger means 4 and the throttle device 6 at the time of a heating operation, and at the time of a cooling operation, it must be connected between the heat transfer heat exchanger means 5 and the throttle device 6.

Therefore, in the embodiment shown in FIG. 1, two throttle devices 6a and 6b are connected in series, and by-passes 11a and 11b having the check valves 10a and 10b are connected in parallel with the respective throttle devices 6a and 6b, and the heat exchanger 9 for preheating the hot-water supply is connected between the above-mentioned two throttle devices 6a and 6b. At the time of a heating operation, the refrigerant which flows from the space conditioning heat exchanger means 4 acting as a condenser, will flow through the by-pass 11a, the heat exchanger 9 for preheating the hot-water supply, and the throttle device 6b and be compressed therein. At the time of a cooling operation, the refrigerant, which flows from the heat transfer heat exchanger means 5 acting as a condenser, will flow through the by-pass 11b, the heat exchanger 9 for preheating the hot-water supply, and the throttle device 6a and be decompressed therein.

Figure 2:
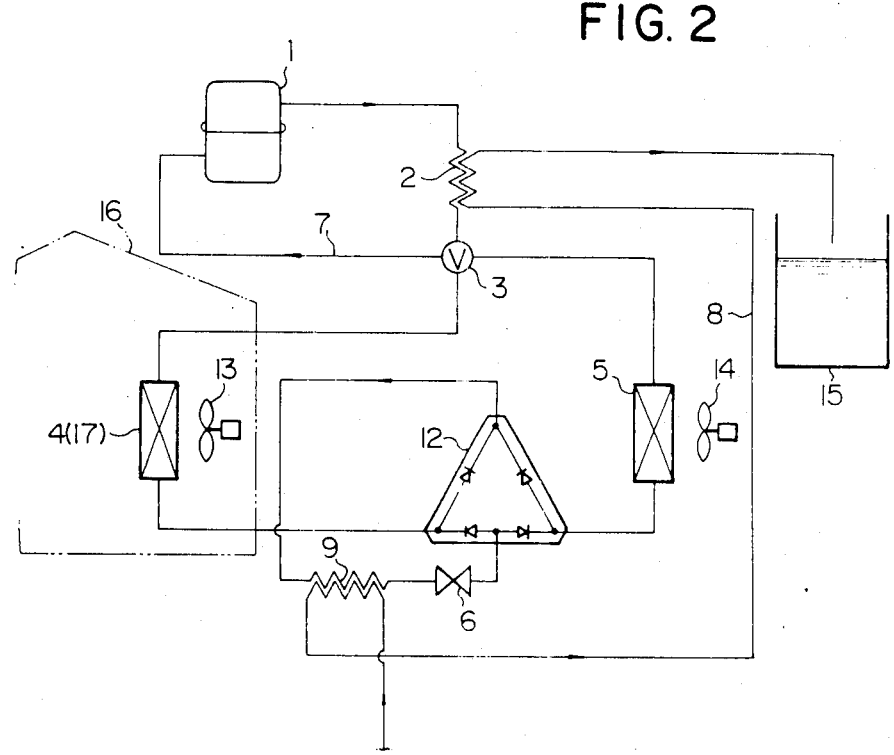
FIG. 2 is a diagram of a refrigerant circuit showing another embodiment of the present invention.

FIG. 2 shows another embodiment. In this embodiment, a manifold check valve 12 is used. The refrigerant flows from the space conditioning heat exchanger means 4 during a heating operation and the refrigerant flows from the heat transfer heat exchanger means 5 during a cooling operation, and in each case passes through the manifold check valve 12, the heat exchanger 9 for preheating the hot-water supply and after that, the throttle device 6.

Figure 3:
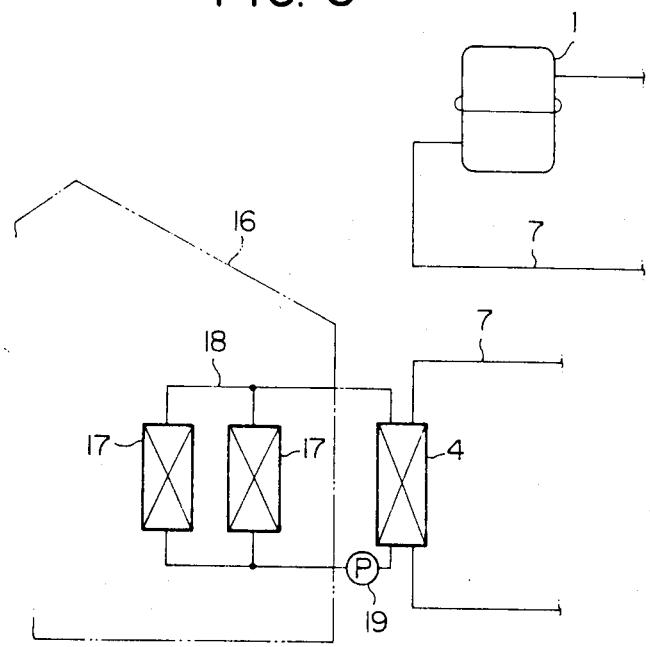
FIG. 3 is a diagram of part of a refrigerant circuit showing part of the embodiment in which the space conditioning heat exchanger means includes a separate indoor heat exchanger.

In the drawing, reference numerals 13 and 14 designate fans. Reference numeral 15 designates a hot-water storage tank. And, reference numeral 16 designates a house. FIG. 1 and FIG. 2 shows a refrigerant circuit in which the space conditioning heat exchanger means 4 is installed in the house 16 and is an indoor heat exchanger 17. FIG. 3 shows part of the refrigerant circuit in which the space conditioning heat exchanger means 4 compresses an outdoor heat exchanger 4a the indoor heat exchanger 17 separately, the outdoor heat exchanger 4a and the indoor heat exchanger 17 being connected with a circulating pipe 18 which circulates the heat exchange medium, and the heat exchange medium in the circulating pipe 18 being circulated by the pump 19.

Then, in both cooling and heating operations, before the refrigerant, which still has usable heat even when it is condensed in the space conditioning heat exchanger means 4 or the heat transfer heat exchanger means 5 acting as a condenser, is decompressed by the throttle device 6, makeup water is heated in the heat exchanger 9 for preheating the hot-water supply, and the makeup water heated therein is sent to the heat exchanger for hot-water supply 2 connected to the discharge side of the compressor 1 by the water supply piping 8, and is heated therein, and therefore, the hot-water supply capacity can be increased.

When the air-conditioning is not carried out and only a hot-water supply operation is performed, the hot-water can be supplied by circulating the refrigerant in the same circuit as for the heating operation. In this case, the fan 13 provided in the space conditioning heat exchanger means 4 need not be operated.

When only an air-conditioning operation is carried out, the valve of the water supply piping 8 may be closed and the flow of the makeup water may be stopped.

Figure 4:
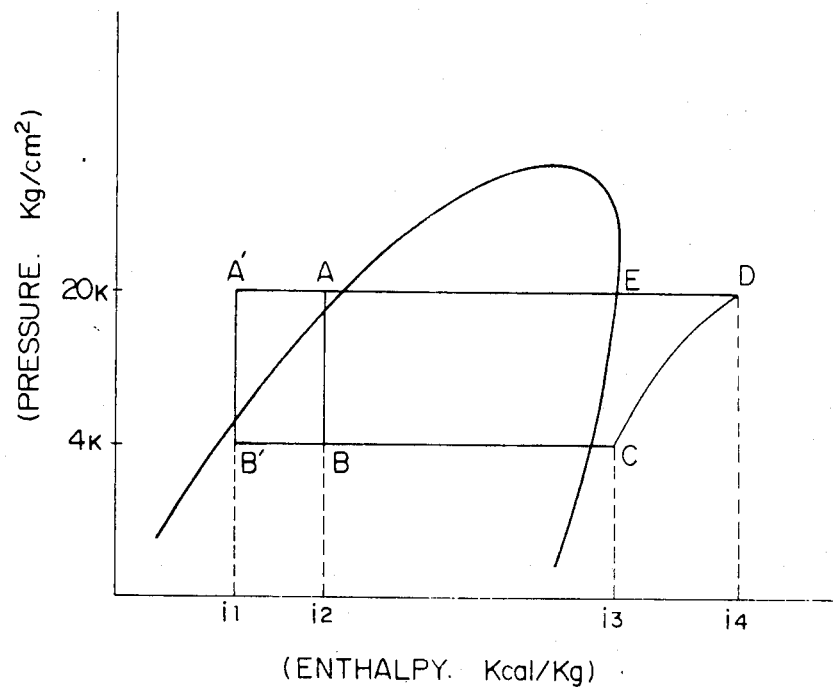
FIG. 4 is a graph showing the increase in the hot-water supply capacity and the cooling capacity of the present invention.

The hot-water supply capacity obtained by connecting the heat exchanger 9 for preheating the hot-water supply between the condenser and the throttle device 6 is described by a Mollier Line shown in FIG. 4.

The usual air-conditioning cycle is carried out in the order of A—B—C—D—E—A. However, for the hot-water supply operation at the time of cooling, the cycle is carried out in the order of A'—B'—B—C—D—E—A—A'. Compared with the conventional cycle, the cooling capacity is B—B', namely, the Enthalpy is increased to $i_1$-$i_2$. At the same time, in the heat exchanger 9 for preheating the hot-water supply, the super cooling part of $i_1$-$i_2$ is increased as the hot-water supply capacity.

When the air-conditioning operation is not carried out and only hot-water supply is performed, B—B', namely, the $i_1$-$i_2$ part is increased, compared with the usual air-conditioning operation. By heat-exchanging the liquefied refrigerant not used due to low temperature in the usual air conditioner with the makeup water having lower temperature, $i_1$-$i_2$ is increased as a hot-water supply capacity. When the hot-water supply operation is performed at the time of heating, the Enthalpy $i_1$-$i_2$ for A—A' is increased, compared with the usual heating operation, and by that amount, the hot-water supply capacity is increased.

According to the present invention as described above, the device is composed of the heat pump refrigerant circuit consisting of the compressor, heat exchanger for hot-water supply, refrigerant switching device, space conditioning heat exchanger means which becomes a condenser at the time of heating and an evaporator at the time of cooling, heat transfer heat exchanger means which becomes a condenser at the time of cooling and an evaporator at the time of heating, and a throttle device. The heat exchanger for preheating the hot-water supply is connected between the heat exchanger means acting as a condenser and the throttle device, the makeup water is heated in the heat exchanger for preheating hot-water supply, and then the heated makeup water is heated in the heat exchanger for hot-water supply. Thus, in cooling and heating operations the refrigerant, which still has significant heat even when it is condensed in the space conditioning heat exchanger means or the heat transfer heat exchanger acting as a condenser, is decompressed with the throttle device, and the makeup water is heated in the heat exchanger for preheating the hot-water supply, and the makeup water heated therein is heated in the heat exchanger for the hot-water supply. Consequently, the hot-water supply capacity is rapidly increased, and further, the increased part of the above-described hot-water supply capacity can increase the cooling capacity. The device has excellent effects as an air-conditioning system hot-water supply device, as described above.

What is claimed is:

1. An air conditioning system including hot water supply means for producing hot water, said system comprising:
   a heat pump refrigerant circuit having a compressor, a hot water heat exchanger connected to the compressor for exchanging heat of the compressed refrigerant with water to be heated, a refrigerant switching device connected to the hot water heat exchanger, a space conditioning heat exchanger means connected to said switching device and which operates as a condenser during a heating cycle and as an evaporator during a cooling cycle, a heat transfer heat exchanger means connected to said switching device and which operates as a condenser during the cooling cycle and as an evaporator during the heating cycle, and throttle means connected between said space conditioning heat exchanger means and said heat transfer heat exchanger means;
   a water preheater heat exchanger means having a water side connected to said hot water heat exchanger, and having a refrigerant side; and
   means for, when said space conditioning heat exchanger is acting as a condenser, connecting the downstream end of said space conditioning heat exchanger to the upstream end of said refrigerant side of said water preheater heat exchanger means and connecting the downstream end of said refrigerant side to the upstream end of said throttle means, and for, when said heat transfer heat exchanger means is acting as a condenser, connecting the downstream end of said heat transfer heat exchanger means to the upstream end of said refrigerant side to said throttle means,
   whereby the water preheater heat exchanger preheats water before supplying it to the hot water heat exchanger to thereby increase the heat supplied to the hot water produced by the system.

2. An air conditioning system as claimed in claim 1 in which said throttle means comprises a first throttle connected between said water preheater heat exchanger and said space conditioning heat exchanger means and a bypass connected around said first throttle with a one way valve therein permitting only flow from said space conditioning heat exchanger means toward said water preheater heat exchanger, and a second throttle connected between said water preheater heat exchanger and said heat transfer heat exchanger means and a bypass connected around said second throttle with a further one way valve therein permitting only flow from said heat transfer heat exchanger means toward said water preheater heat exchanger.

3. An air conditioning system as claimed in claim 1 in which said throttle means comprises a throttle connected in series with said water preheater heat exchanger, and manifold check valve means connected between said series connected throttle and water preheater heat exchanger and said space conditioning heat exchanger means and said heat transfer heat exchanger means for directing refrigerant in series through said water preheater heat exchanger and said throttle whether the refrigerant comes from said space conditioner heat exchanger means or from said heat transfer heat exchanger means.

* * * * *